US007469300B2

(12) United States Patent
de Bonet et al.

(10) Patent No.: US 7,469,300 B2
(45) Date of Patent: Dec. 23, 2008

(54) SYSTEM AND METHOD FOR STORAGE AND RETRIEVAL OF ARBITRARY CONTENT AND APPLICATION DATA

(75) Inventors: Jeremy S. de Bonet, N. Andover, MA (US); Todd A. Stiers, Berkeley, CA (US); Jeffrey R. Annison, Clayton, CA (US); Phillip Alvelda, VII, Berkeley, CA (US); Paul M. Scanlan, Mill Valley, CA (US)

(73) Assignee: MobiTV, Inc., Emeryvile, CA (US)

( * ) Notice: Subject to any disclaimer, the term of this patent is extended or adjusted under 35 U.S.C. 154(b) by 1214 days.

(21) Appl. No.: 10/345,593

(22) Filed: Jan. 16, 2003

(65) Prior Publication Data

US 2003/0177197 A1 Sep. 18, 2003

Related U.S. Application Data

(60) Provisional application No. 60/349,378, filed on Jan. 18, 2002, provisional application No. 60/349,344, filed on Jan. 18, 2002.

(51) Int. Cl.
*G06F 15/16* (2006.01)

(52) U.S. Cl. .......................... 709/245; 709/213; 705/15

(58) Field of Classification Search ................. 709/245, 709/213; 705/15
See application file for complete search history.

(56) References Cited

U.S. PATENT DOCUMENTS

| | | | | |
|---|---|---|---|---|
| 5,497,434 | A | 3/1996 | Wilson | |
| 5,581,737 | A * | 12/1996 | Dahlen et al. | 711/170 |
| 5,825,917 | A | 10/1998 | Suzuki | |
| 5,991,773 | A | 11/1999 | Tagawa | |
| 6,005,979 | A | 12/1999 | Chang et al. | |
| 6,009,192 | A | 12/1999 | Klassen et al. | |
| 6,473,749 | B1 * | 10/2002 | Smith et al. | 707/2 |
| 2002/0120724 | A1 | 8/2002 | Kaiser et al. | |
| 2002/0143899 | A1 | 10/2002 | Di Perna | |
| 2002/0156980 | A1 | 10/2002 | Rodriguez | |

OTHER PUBLICATIONS

International Search Report for PCT/US02/28994, Dec. 4, 2002.

(Continued)

*Primary Examiner*—Jason Cardone
*Assistant Examiner*—Adnan M Mirza
(74) *Attorney, Agent, or Firm*—Sprinkle IP Law Group

(57) ABSTRACT

Systems and methods for improving the performance of a data storage and retrieval system by enabling dynamic switching from one internal data structure to another in response to detecting conditions indicating that a switch would improve performance. In one embodiment, a network proxy implements a cache using a first internal data structure. The caches objects comprise Web pages, and the cache keys comprise URLs corresponding to the Web pages. The proxy monitors cache usage and periodically determines costs associated with usage of the first data structure and an alternative data structure. If the costs associated with the alternative data structure are less than the costs associated with the first data structure, the proxy crates the alternative data structure, migrates data from the first data structure to the alternative data structure, begins using the alternative data structure for the cache, and deletes the first data structure.

45 Claims, 2 Drawing Sheets

OTHER PUBLICATIONS

Robert W. Floyd & Louis Steinberg, "*An adaptive algorithm for spatial gray scale*" SID 75 Digest: 36-37, 1975.

Paul Heckbert, "*Color image quantization for frame buffer display*" Computer Graphics, 16(3):297-307, Jul. 1982.

C. E. Shannon, "*A mathematical theory of communication*" The Bell System Technical Journal, pp. 623-656, Jul. 1948.

C. E. Shannon, "*A mathematical theory of communication, Part III.*" The Bell System Technical Journal, pp.623-656, Jul. 1948.

T. A. Welch, "*A technique for high-performance data compression*" Computer, 17(6): 8-19, Jun. 1984.

Jacob Ziv, "*Coding theorems for individual sequences*" IEEE Transactions on Information Theory, 24(4): 405-412, Jul. 1978.

Jacob Ziv & Abraham Lempel, "*A universal algorithm for sequential data compression*" IEEE Transactions on Information Theory, 24(3): 337-343, May 1977.

Jacob Ziv & Abraham Lempel, "*Compression of individual sequences via variable-rate coding*" IEEE Transactions on Information Theory, 24(5): 530-536, Sep. 1978.

* cited by examiner

SYSTEM AND METHOD FOR STORAGE AND RETRIEVAL OF ARBITRARY CONTENT AND APPLICATION DATA

CROSS-REFERENCE TO RELATED APPLICATIONS

This application claims priority to U.S. Provisional Patent Application No. 60/349,378, entitled "OneCache: An Abstract Design for Storage and Retrieval of Arbitrary Content and Application Data," by Jeremy S. de Bonet, Todd A. Stiers, Jeffery R. Annison, Philip Alvelda VII, and Paul M. Scanlan, filed Jan. 18, 2002, U.S. Provisional Patent Application No. 60/349,344, entitled "modular Plug-In transaction Processing Architecture" by de Bonet et al., filed on Jan. 18, 2002, which are hereby fully incorporated by reference herein. Additionally, U.S. patent application Ser. No. 10/342,113, entitled "Method and System of Performing Transactions Using Shared Resources and Different Applications," by de Bonet et al., filed Jan. 14, 2003, now U.S. Pat. No. 7,073,178, is incorporated by reference herein.

BACKGROUND OF THE INVENTION

1. Technical Field

This invention generally relates to storage and retrieval of electronic entities. More particularly, this invention relates to automatically changing the data structure of a storage and retrieval system based on the detection of conditions indicating that a different structure would provide improved performance.

2. Related Art

Some data storage and retrieval mechanisms use lookup keys to store and identify data. Such mechanisms include caches, associative arrays, and databases. The keys are associated with the corresponding data according to a specific internal data structure. These internal data structures may, for example, comprise trees, hashes, heaps, and lists. Each of these data structures enables the storage of data in a different manner and therefore provides different performance characteristics. Some of these data structures are described briefly below.

A list is simply an unordered set (a list) that enumerates all of the keys and corresponding data. A hash is an associative array in which a key is converted to a hash table entry. The hash table entry defines the position in a hash table in which the corresponding data is stored. The hash table is static and may be only partially filled. A tree is a hierarchical data structure in which keys and their associated data are stored in a sorted manner. A heap is a tree which is only partially sorted. Hybrid structures may combine, for instance, a first layer of trees or heaps with a second layer of hashes or lists.

Different data structures are optimal for different uses. Consequently, the selection of a data structure for use in a particular application typically depends upon the manner in which the data is expected to be used, as well as the amount of the data to be stored, and the type of access to the data that will be needed. The greater particularity with which these factors can be specified, the more accurately a developer can select an "optimal" data structure for the application.

It is therefore apparent that one of the problems with selecting a data structure that will provide the best performance in an application is identifying the conditions under which the data structure will be used. While it may be relatively easy to identify factors such as the type of data that will be stored and the types of access that will be needed, it is typically much more difficult to identify things like the frequency of accesses, or any patterns with which the accesses are made.

As a result of the difficulty in predicting some of the factors which form the basis for determining which data structure is "optimal," a software developer may simply have to make an educated guess as to which type of data structure will ultimately provide the best performance. This guess may turn out to be accurate, or it may not. If the developer has selected a data structure that is not actually optimal, the performance of the application may be substantially degraded by the less-than-optimal performance of the selected data structure.

SUMMARY OF THE INVENTION

One or more of the problems outlined above may be solved by the various embodiments of the invention. Broadly speaking, the invention comprises systems and methods for improving the performance of a data storage and retrieval system by enabling dynamic switching from one internal data structure to another in response to detecting conditions indicating that a switch would improve performance. These systems and methods provide a mechanism for gathering statistics on the system as it is being operated and modifying the internal data structure of the system as necessary to provide optimal performance for the current usage. These systems and methods are applicable to any storage and retrieval system that uses keys to store and identify data and are particularly applicable to Web caching.

One embodiment of the invention comprises a method in which a first internal data structure is provided for storing a plurality of objects. The first internal data structure is used during operation of a system in which it is implemented, and the usage of the first internal data structure is monitored. Periodically, a cost associated with usage of the first internal data structure is determined. A cost associated with usage of an alternative internal data structure is also determined, based upon either empirical usage data or statistically estimated usage data. The cost associated with the alternative internal data structure may also include the cost of transitioning from the first internal data structure to the alternative internal data structure. The costs of the first and alternative internal data structures are then compared to determine whether or not the system should switch to use of the alternative internal data structure. If not, the first internal data structure remains in use. If so, the alternative internal data structure is created, data is migrated from the first internal data structure to the alternative internal data structure, operations using the alternative internal data structure are begun, and the first internal data structure is deleted.

Another embodiment of the invention comprises a system in which a method similar to the foregoing method is implemented. In one embodiment, the system comprises a network proxy having a data processor and memory, wherein the data processor is configured to implement a cache using a first internal data structure in the memory. Each entry in the cache comprises a Web page as the data object and a corresponding URL as the key. The data processor is configured to monitor usage of the cache and to periodically determine costs associated with usage of the first internal data structure and an alternative internal data structure. The cost associated with usage of an alternative internal data structure is determined based upon either empirical usage data or statistically estimated usage data and includes the cost of switching from the first internal data structure to the alternative internal data structure. The data processor compares the costs of the first and alternative internal data structures to determine whether or not the system should switch to use of the alternative internal data structure. If indicated by the comparison, the data processor creates the alternative internal data structure, migrates data from the first internal data structure to the alternative internal data structure, begins using the alternative internal data structure for the cache, and deletes the first internal data structure.

Another embodiment of the invention comprises a software application. The software application is embodied in a computer-readable medium such as a floppy disk, CD-ROM, DVD-ROM, RAM, ROM, database schemas and the like. The computer readable medium contains instructions which are configured to cause a computer to execute a method which is generally as described above. It should be noted that the computer readable medium may comprise a RAM or other memory which forms part of a computer system. The computer system would thereby be enabled to perform a method in accordance with the present disclosure and is believed to be within the scope of the appended claims.

Numerous additional embodiments are also possible.

BRIEF DESCRIPTION OF THE DRAWINGS

Other objects and advantages of the invention may become apparent upon reading the following detailed description and upon reference to the accompanying drawings.

Figure 1:
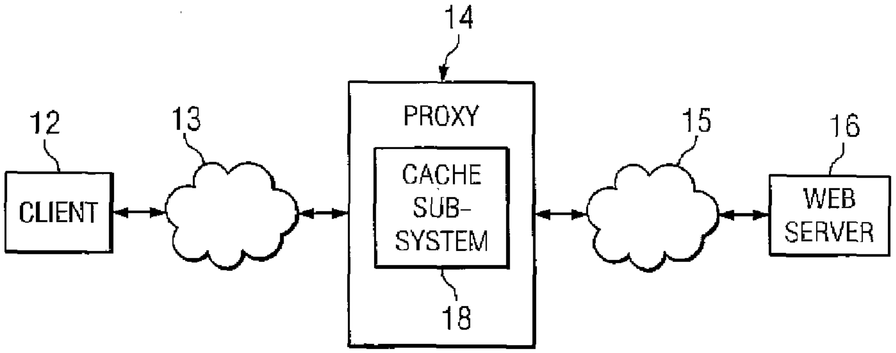
FIG. 1 is a diagram illustrating an exemplary architecture for a network system employing a network proxy.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF A PREFERRED EMBODIMENT

A preferred embodiment of the invention is described below. It should be noted that this and any other embodiments described below are exemplary and are intended to be illustrative of the invention rather than limiting.

Broadly speaking, the invention comprises systems and methods for improving the performance of a data storage and retrieval system by enabling dynamic switching from one internal data structure to another in response to detecting conditions indicating that a switch would improve performance. These systems and methods provide a mechanism for gathering statistics on the system as it is being operated and modifying the internal data structure of the system as necessary to provide optimal performance for the current usage. These systems and methods are applicable to any storage and retrieval system that uses keys to store and identify data and are particularly applicable to Web caching.

One embodiment of the invention comprises a dynamically self-modifying Web cache system implemented in a network proxy. The Web cache is configured to store Web pages using URLs as keys. The Web cache initially uses a list data structure to store the Web pages. As the network proxy operates, Web pages are stored in the Web cache and retrieved from the Web cache. Web pages in the cache may also be updated or removed.

Operations on the Web cache are monitored to determine the cost of operation of the cache using the current (list) data structure. Periodically, the current cost of operation is compared to a cost of operation that is computed for one or more alternative data structures. The cost associated with the alternative data structure may be computed on the basis of estimated usage, or empirically determined usage. The Web cache system also computes a cost associated with a switch from the currently-used data structure to the alternative data structure. If the cost of the currently-used data structure is greater than the cost of the alternative data structure, plus the cost of switching to the alternative data structure, the Web cache will initiate a switch to the alternative data structure. This essentially comprises the creation of the alternative data structure, the migrations of data from the current data structure to the alternative data structure, and the transfer of operations from the formerly current data structure (the list) to the now-current alternative data structure. The formerly current data structure is then deleted.

When the Web cache begins operation with the alternative data structure, the cost of operation of the cache using this data structure is less than the cost of operation using the previous data structure under the current usage conditions. The Web cache continues to monitor its operation, however, and may switch back to use of the previous data structure or another data structure if the usage conditions change. Thus, the Web cache optimizes its performance by switching from a less optimal data structure for the conditions to a more optimal data structure.

It should be noted that, although the present disclosure focuses on embodiments of the invention that are implemented in a Web cache in a network proxy, the invention is more broadly applicable to any storage and retrieval system that uses keys to store and identify data. For example, another embodiment may comprise a cache configured to store parameter sets. The parameter sets may contain such information as configuration data (e.g., parameter values and corresponding names), or network connection data (e.g., protocols that are used for a connection and the system and port to which the connection is made). Such an implementation may provide greater performance improvements than a Web cache implementation because, while the storage patterns involved in the caching of Web pages are relatively well understood, the usage of parameter sets can vary widely from application to application, and even from user to user. The parameter set cache may therefore be able to take greater advantage of the present systems' and methods' adaptability to changing usage patterns. An embodiment implemented in a file system cache is another example of an implementation that may take greater advantage of the adaptability of the present systems and methods. Nevertheless, the present disclosure will focus on network proxy implementations, as they may present more easily understandable embodiments of the invention.

As noted above, a preferred embodiment of the invention is implemented in a network proxy. Referring to FIG. 1, a diagram illustrating an exemplary architecture for a network system employing a network proxy is shown. In this figure, the architecture comprises a client 12 which is coupled to a network proxy 14, which is in turn coupled to a Web server 16. Network proxy 14 includes a cache subsystem 18. Client 12 is coupled to proxy 14 via a first network 13. Proxy 14 is coupled to Web server 16 by a second network 15. It is contemplated that at least one of networks 13 and 15 comprises the Internet. The other of these networks may comprise a network which is either internal or external to a particular enterprise. It should be noted, however, that the coupling of client 12, proxy 14 and Web server 16 need not be configured in any particular manner for the purposes of the invention.

A proxy handles communication between a client device or program, such as a Web browser, and a server device or program, such as a Web server. In a Web-based system, the proxy handles the clients' requests for Web content, as well as the Web content provided by the Web server in response to these requests. In handling these communications, the proxy is responsible for emulating the Web server and thereby reducing the loading on the system (both on the Web server and on the network itself). The proxy does this by storing some of the content provided by the Web server and, when possible, providing this stored content to clients in response to requests for the content. In this manner, the proxy relieves the Web server of the burden of serving a portion of the clients' requests.

Figure 2:
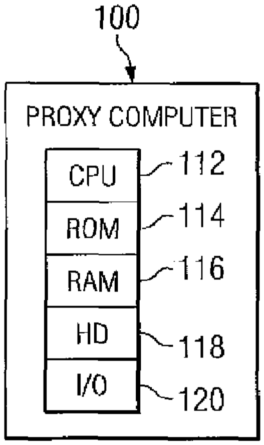
FIG. 2 is a diagram illustrating the basic configuration of a computer suitable for use as a network proxy in accordance with one embodiment of the invention.

Referring to FIG. 2, a diagram illustrating the basic configuration of a computer suitable for use as a network proxy in accordance with one embodiment of the invention is shown. Server 14 is implemented in a computer system 100. Computer system 100 includes a central processing unit (CPU) 112, read-only memory (ROM) 114, random access memory (RAM) 116, hard disk drive (HD) 118, and input output device (I/O) 120. Computer system 100 may have more than one CPU, ROM, RAM, hard disk drive, input-output device or other hardware components. Computer system 100 is nevertheless depicted as having only one of each type of component. It should be noted that the system illustrated in FIG. 2 is a simplification of an exemplary hardware configuration, and many other alternative configurations are possible. A more detailed description of an exemplary architecture is described in U.S. patent application Ser. No. 10/342,113, by inventors Philip Alvelda VII, Todd A. Stiers, and Jeremy S. de Bonet filed on Jan. 14, 2003 and entitled "Method And System Of Performing Transactions Using Shared Resources And Different Applications", which is incorporated by reference as if set forth herein in its entirety.

Portions of the methods described herein may be implemented in suitable software applications that may reside within memories such as ROM 114, RAM 116 or hard disk drive 118. The software applications may comprise program instructions that are configured to cause the data processor in which they execute to perform the methods described herein. These instructions may be embodied in (stored on) internal storage devices such as ROM 114, RAM 116 or hard disk drive 118, other, and external storage devices, or storage media readable by a data processor such as computer system 100, or even CPU 112. Such media may include, for example, floppy disks, CD-ROMs, DVD ROMs, magnetic tape, optical storage media, and the like.

In an illustrative embodiment of the invention, the computer-executable instructions may be lines of compiled $C^{++}$, Java, or other language code. Other architectures may be used. For example, the functions of any one of the computers may be performed by a different computer shown in FIG. 2. Additionally, a computer program or its software components with such code may be embodied in more than one data processing system readable medium in more than one computer.

In the hardware configuration above, the various software components may reside on a single computer or on any combination of separate computers. In alternative embodiments, some or all of the software components may reside on the same computer. For example, one or more the software component(s) of the proxy computer 100 could reside on a client computer or server computer, or both. In still another embodiment, the proxy computer itself may not be required if the functions performed by the proxy computer are merged into a client computer or server computer. In such an embodiment, the client computer and server computer may be directionally coupled to the same network.

Communications between any of the client, server and proxy computers can be accomplished using electronic, optical, radio-frequency, or other signals. For example, when a user is at a client computer, the client computer may convert the signals to a human understandable form when sending a communication to the user and may convert input from a human to appropriate electronic, optical, radio-frequency, or other signals to be used by the proxy or server computers. Similarly, when an operator is at the server computer, the server computer may convert the signals to a human understandable form when sending a communication to the operator and may convert input from a human to appropriate electronic, optical, radio-frequency, or other signals to be used by the computers.

As explained above, the proxy is responsible for storing information previously provided by the Web server so that this information can be provided to clients in response to their requests. This information is stored in the Web cache of the proxy. The network proxy provides a mechanism for gathering statistics on the operation of the Web cache using a current type of data structure and determining a cost associated with usage of this data structure. A cost associated with the usage of an alternative type of data structure is also determined for the same usage conditions. If it is determined that the alternative type of data structure would operate more efficiently than the type currently in use, the internal data structure of the Web cache is modified to the alternative type of data structure.

Figure 3:
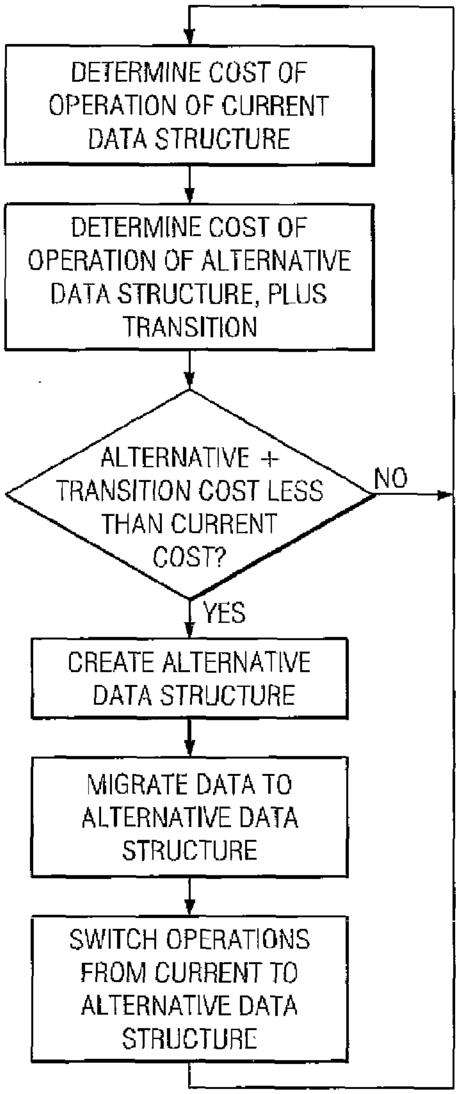
FIG. 3 is a flow diagram illustrating a simple method in accordance with one embodiment of the invention.

Referring to FIG. 3, a flow diagram illustrating a simple method in accordance with one embodiment of the invention is shown. This figure depicts a series of steps that are taken periodically during operation of the Web cache. This may occur more or less frequently, depending upon the needs of the system. For example, if the usage patterns are very irregular, it may be desirable to repeat the steps of the method frequently. If the usage patterns change more slowly, it may be better to repeat the steps less frequently.

The method depicted in the figure assumes that the usage of the Web cache is continually monitored so that, at any given time, usage information is available for use in determining the costs associated with the different data structures. The method then comprises the computation of costs, comparison of the costs and switching to an alternative data structure if necessary.

The first step in this method is determining the "cost" of operating the current data structure. "Cost," as used here, refers to resources that are used in the operation of the Web cache, including processing time, memory and possibly other types of resources. The determination of the cost of operation is accomplished by associating costs with each of the operations on the Web cache and computing the total cost based on the operations that have been performed on the Web cache. The operations on the Web cache may be incorporated into the computation through the use of empirical data or statistical data on the operations. The total cost may also incorporate other factors, such as the size of the stored data set, the amount of resources available, and so on.

The next step is to determine the cost of operation of the alternative data structure, plus the cost of a potential transition from the current data structure to the alternative data structure. The cost of operation of the alternative data structure is determined is much the same way as for the current data structure, using either empirical or statistical data on the Web cache operations.

In addition to determining the cost of operation of the alternative data structure, it is also necessary to determine the cost of transitioning to the alternative data structure from the current data structure. This is true because, in order to start using the alternative data structure, it will be necessary to first create the structure and then populate it with the data from the current data structure. A small improvement in operational cost may therefore be outweighed by the transition costs, making it impractical to switch to the alternative data structure.

After the costs associated with the current and alternative data structures (including transition costs) have been determined, these costs are compared. If the costs associated with the alternative data structure are lower than the costs associated with the current data structure, then a switch from the current data structure to the alternative data structure will be initiated. It should be noted that, although the comparison is depicted in the figure as a simple "less than" comparison between the costs, more complex functions may be used in other embodiments to determine whether the switch to the alternative data structure is initiated. Such functions may incorporate the costs described above and/or may take into account various other factors to determine whether it is desirable to switch to the alternative data structure.

If the cost of operation of the current data structure is less than the expected cost of switching to and operating the alternative data structure, no action is taken, except to repeat the process at a later time. If the expected cost of switching to and operating the alternative data structure is less than the cost of operation of the current data structure, then the switch to the alternative data structure is initiated. The switch entails creating the alternative data structure, migrating the data from the current data structure to the alternative data structure, and beginning operation using the alternative data structure. The formerly-current data structure is typically deleted after the switch to the alternative data structure.

When deciding whether to change the internal data structure of a particular cache instance, algorithms in the preferred embodiment consider five factors, though others could also be considered:

How many objects are currently stored in the cache?

How many lookups (or reads) does the system perform?

How many stores (or writes) does the system perform?

How much memory is available on the current system? How much of the available memory should the storage and retrieval system use?

What would be the cost of reconfiguring the current data structure?

To consider the relative costs (i.e., CPU time and RAM used) of alternate data structures, algorithms in the current cache system consider the costs of performing the following actions, though other costs could be easily incorporated into the cache as well:

Looking up (or reading) a piece of data from the cache using the current data structure. (Lookup time is a function of the number of objects stored in the cache. It also depends on the internal data structure of the cache; for example, a hash table can look up and store objects in constant time.)

Storing (or writing) a piece of data to the cache using the current data structure Restructuring the internal data The current cache system can estimate these costs for two or more data structures based on the current usage. It can perform calculations on costs by using the theoretical computational complexity of the storage algorithms, by using empirical measurements, or by using some combination thereof. If the cache makes the decision to change the internal data structure of its storage and retrieval system, it internally allocates a new object, then copies and stores data from the old structure to the new one. After migrating all data to the new structure, the cache system deletes the old structure.

The present cache system's monitoring of usage statistics and making decisions based on the monitored usage incurs a minor cost (in CPU time and RAM) to the system. This cost depends, for example, on how often the cache system checks the usage statistics and how many different internal data structures it considers. For cases in which a data structure does not need to change at all, a developer can eliminate the cost entirely by configuring the program not to perform any checks, in which case the cache system is exactly equivalent to the internal data structure that it is currently using.

In a preferred embodiment of the invention, a cache system collects usage statistics and applies algorithms to select a structure which is optimal for the actual usage of a storage and retrieval system, then modifies the internal data structure of the system to adopt the optimal structure. The cache system can thereby dynamically shift the internal data structure for the storage and retrieval system among the data structures that are defined for the system. These data structures may include trees, hashes, heaps, lists, and hybrid structures, such as heaps of lists.

In addition to internal usage statistics, the present cache system can consider the type of data being stored and the type of key used to access the data. Because types of data and keys can affect usage, and because the cache system can alter its internal data structure based on internal usage statistics, the cache system allows a single programming construct to handle multiple types of data and keys. The cache system is novel in its ability to create a cache for any type of key and data. This is in distinct contrast to caching or other storage systems in the prior art, which must be built for a specific type of data that uses a specific type of key.

The dynamically self-modifying cache described herein may be considered a superset of a number of internal data structures, any one of which can be used by the cache object to store and retrieve data. In one embodiment, the cache is implemented using C++ templates to create the different internal data structures. Although, in the preferred embodiment, C++ is used to represent the programmatic structures of the cache system, most Turing complete programming languages with macro support could be used. A C++ template makes it unnecessary to write separate bodies of code to accomplish similar tasks on differing data types. It makes the tasks abstract, allowing one set of C++ code to be applied to different types of data. To accomplish a specific task, the template can be instantiated using the particular types that the task calls for. In the case of the template for the present cache system, cache keys and values of any type can be used to instantiate the template.

This cache system makes it unnecessary for programmers to understand before building a storage and retrieval system how the system will be used. Once a storage and retrieval system in accordance with this disclosure is created, it is not necessary to review statistics manually, create new data structures, or require developers or system administrators to migrate data. In particular, this means that if programs using the present cache system are designed to be used under one set of circumstances, and those circumstances change, the entire program continues to run optimally, and it does not need to be rewritten as a prior art program would.

An additional benefit of the present cache system is its ability to handle any type of data or key. Within a computer, many types of information need to be stored and retrieved. A cache has many advantages over more general storage and retrieval methods when retrieval time is more important than storage time. Before the creation of the present cache system, however, development of caches was specialized to the type of content being stored and the type of key used to reference that data. By encapsulating the underlying methods needed by a cache and abstracting the functionality particular to the type of key and type of content, the present methodologies allow for the creation of caches of arbitrary key and data type with a single programming construct.

In the preferred embodiment, the definition of the cache system is completely recursive. That is, one instance of a cache in the system can refer to another instance of a cache in the system. This allows for the easy creation of multi-tiered cache systems (caches of caches) as described in commonly owned U.S. patent application Ser. No. 10/345,886, now U.S. Pat. No. 7,130,872, entitled "A Multi-Tiered Caching Mechanism for the Storage and Retrieval of Content Multiple Versions," by inventor Jeremy S. de Bonet, filed on Jan. 16, 2003, which is incorporated by reference as if set forth herein in its entirety.

In another embodiment, a cache object in accordance with this disclosure can be used to create a method for protecting shared resources across multiple threads. In this case, the key used is the name of the resource (or variable), and the value is the shared resource itself. This embodiment is described in detail in commonly owned U.S. patent application Ser. No. 10/345,067, entitled "A Method for Protecting Shared Resources Across Multiple Threads," by inventor Jeremy S. de Bonet, filed on Jan. 15, 2003, which is incorporated by reference as if set forth herein in its entirety.

Figure 4:
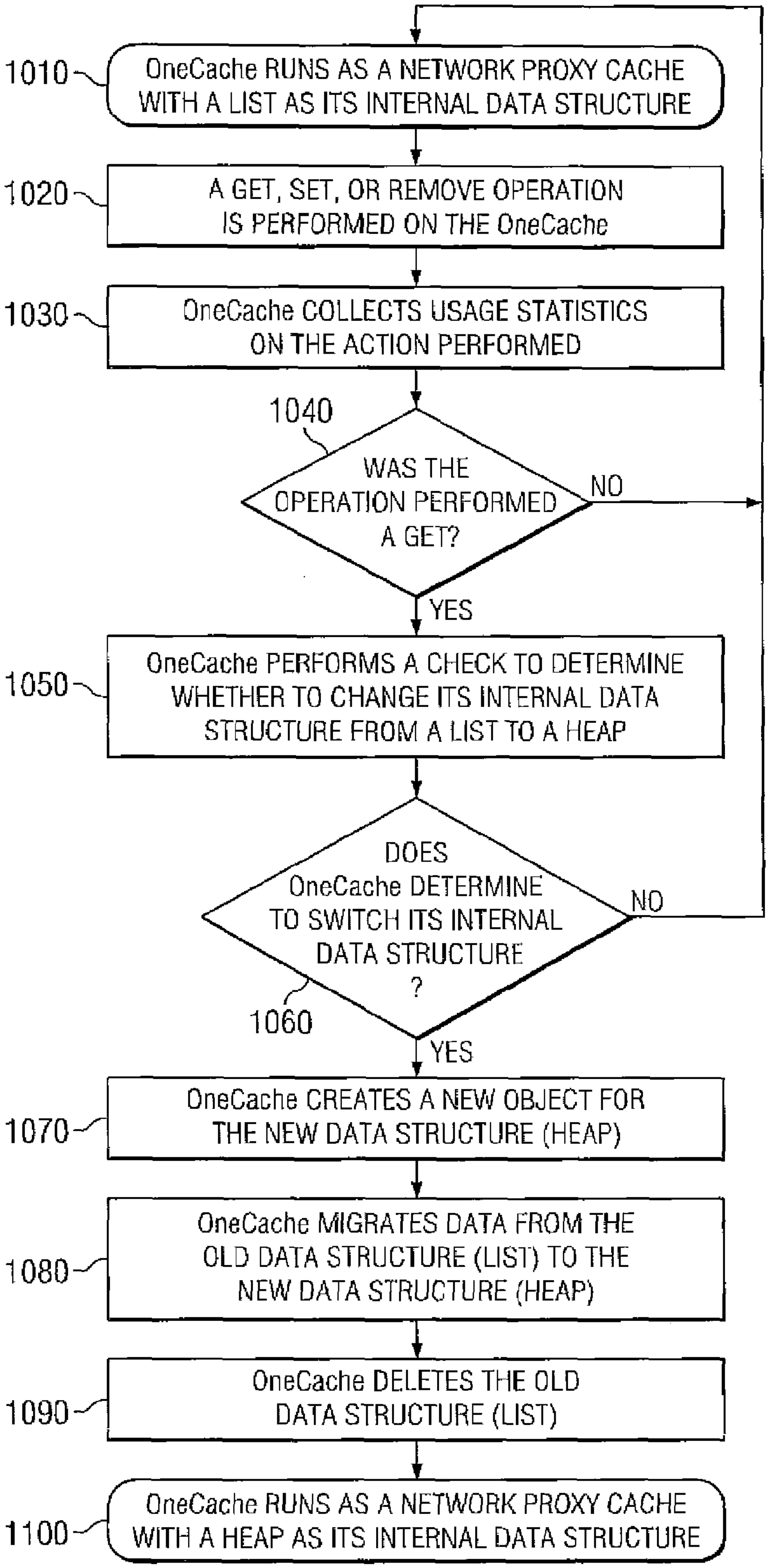
FIG. 4 illustrates the detailed steps that present cache system takes in one embodiment when changing the internal structure of a network proxy cache from a list to a heap.

In the preferred embodiment, the present cache system is used as a Web cache on a network proxy, storing Web Pages and using URLs as keys. FIG. 4 illustrates the detailed steps that the present cache system takes in one embodiment when changing the internal structure of a network proxy cache from a list to a heap. This embodiment is exemplary, and other internal data structures could be used in alternative embodiments. For instance, in another embodiment the cache system may store connection and DNS information. In that case, the key used is the name of a server, and the value is the IP address of the server.

The cache system of the preferred embodiment runs as a network proxy cache with a particular internal data structure which is, in this case, a list (1010). Each time a get, set, or remove operation is performed on the cache (1020), the cache system collects usage statistics (1030). If the operation is a get (1040), the cache system performs a check to determine whether to change its internal data structure from a list to a heap (1050). If the operation is not a get (1040), the system continues to run with a list as its internal data structure (1010). The selection of checking on a get operation here is purely exemplary, and the check could be triggered by any other action taken on the structure or by some other external trigger (e.g. a timer).

If the cache system determines that it should not change its internal data structure (1060), the system continues to run with a list as its internal data structure (1010). If the cache system determines that it should change its internal data structure (1060), the get function triggers the change. The cache system creates a new object (in this case a heap) for the new data structure (1070), then migrates data from the old data structure (the list) to the new data structure (the heap) (1080). The cache system then deletes the old data structure of the list (1090). While these changes are taking place, users can perform get and set functions on the cache. The operations are performed on both the old data structure (the list) and the new data structure (the heap). After the changes have taken place, the cache system runs as a network proxy cache with a heap as its internal data structure (1100).

The preferred embodiment implements the following algorithm to determine whether to switch from the current internal data structure to an alternative data structure. In this embodiment, the computational cost of performing the indicated operation is defined as follows:

G(x,n) is the cost of a get operation using data structure x currently containing n elements.

S(x,n) is the cost of a set operation using data structure x currently containing n elements if the element already exists and a developer is simply changing its value.

A(x,n) is the cost of a set operation using data structure x currently containing n elements (and going to n+1) if the element does not exist and a developer must add it.

R(x,n) is the cost of a remove operation using data structure x currently containing n elements (and going to n−1).

F(x,n) is the cost of freeing a data structure.

$W(x_1,x_2,n)$ is the cost of switching from one data structure to another.

The cost of switching from one data structure to another is given by:

$$W(x_1, x_2, n) = \sum_{n}^{m=1} (G(x_1, n) + A(x, m)) + F(x_1, n)$$

To determine whether it is worthwhile to switch from one data structure to another, the cache system looks at the following usage statistics:

g=number of get operations performed s=number of set operations performed (not requiring new elements to be added)

a=number of set operations performed (which add new elements)

r=number of remove operations performed

A developer could design the program to check the statistics at a configurable time interval or every time a get or set function is performed. In the preferred embodiment, these options are fully configurable by the system administrator In one embodiment, these statistics are adjusted to compensate for how long ago each operation was performed. For example, one way to adjust the statistics is to update each by performing an operation similar to the following examples every time a get is performed:

$$g' = g*0.9+1$$

$$s' = s*0.9$$

$$a' = a*0.9$$

$$r' = r*0.9$$

In this example, ALL of the values are modified when ANY operation is performed. The 0.9 multiplier represents the depreciation due to time.

When determining whether to switch from one data structure to another, the cache system uses the statistics it collects to predict how the system will behave in the future. A switch is worthwhile if the total future cost of access using the new data structure (get, set, add, free) plus the cost of switching is less than the cost of access using the old structure.

In the preferred embodiment, the cache system uses the following approximation or prediction to determine whether to switch from one structure to another. It determines whether the cost of handling current usage patterns plus the cost of switching:

$$g*G(x_2,n)+s*S(x_2,n)+a*A(x_2,n)+r*R(x_2,n)+W(x_1,x_2,n)$$

is greater than, less than, or equal to the cost of handling current usage patterns using the current structure, without switching:

$$g*G(x_1,n)+s*S(x_1,n)+a*A(x_1,n)+r*R(x_1,n)$$

Other ways to do this might involve keeping more elaborate statistics, and then, for example, trying to predict when gets or adds will occur.

In deciding whether to switch data structures, the cache system also may need to take other factors into account, such as memory and CPU availability.

When one embodiment of the cache system determines that it should change its internal data structure, the process may begin in one of two ways. If the cache system is configured to review its statistics every time a specific function (e.g., get) is called, then that function may be able to execute the change. If the cache system is configured to check its statistics in a separate thread, then that thread calls a function that can execute the change.

When executing a change of its internal data structure, the cache system first generates the new data structure, then migrates the data from the old structure to the new structure. After migrating all data, the cache system deletes the old structure. While the program is executing these changes, the data can be both read- and write-available by other threads which need to access the data, though some embodiments may force the changes to be made synchronously. When a get operation is performed concurrently with a restructuring, data may be read from either the old or the new structure. When a set is performed during a restructuring, it will typically need to be written to both structures.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms ‘comprises,’ ‘comprising,’ or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system comprising:

a data processor; and a memory coupled to the data processor;

wherein the data processor is configured to:

implement a cache system that stores a plurality of data objects and corresponding keys within a first internal data structure in the memory, store data in the first internal data structure, monitor usage of the cache system, associate costs with one or more operations on the first internal data structure, determine a first cost of operation associated with the first internal data structure based on the costs associated with the one or more or operations, and if the first cost of operation is greater than a second cost of operation associated with a second data structure which is distinct from the first internal data structure, create the second data structure, migrate the data stored in the first internal data structure to the second data structure, and switch operations from the first internal data structure to the second data structure.

2. The system of claim 1, wherein the data processor and memory reside within a network proxy.

3. The system of claim 2, wherein the data objects comprise Web pages and the corresponding keys comprise uniform resource locators (URLs).

4. The system of claim 1, wherein the system is configured to store network connection and DNS information by storing data objects comprising IP addresses and keys comprising server names corresponding to the IP addresses.

5. The system of claim 1, wherein the system is configured to store configuration parameters by storing selected configuration data as objects and parameter names as keys corresponding to the objects.

6. The system of claim 1, wherein the system is configured to store shared resources as objects and resource identifiers as keys corresponding to the objects.

7. The system of claim 1, wherein the system is configured to store open network connections as objects and systems, ports and communication protocols corresponding to the open network connections as keys corresponding to the objects.

8. The system of claim 1, wherein the internal data structures in the cache system comprise at least two types selected from the group consisting of: lists; hashes, trees, heaps and hybrid data structures.

9. The system of claim 1, wherein the cache system is multi-tiered, and at least one tier of caches is configured to store references to caches as data objects.

10. The system of claim 1, wherein the data processor is configured to create one or more caches in the cache system using a C++ template.

11. The system of claim 1, wherein the data processor is configured to determine second cost of operation associated with the second data structure and compare the first and second costs.

12. The system of claim 11, wherein determining the second cost of operation associated with the second data structure includes determining a cost for transitioning to the second data structure.

13. The system of claim 12, wherein determining a cost for transitioning to the second data structure comprises determining a cost for creating the second data structure, determining a cost for migrating data from the first internal data structure to the second data structure, and determining a cost for switching operations from the first internal data structure to the second data structure.

14. A method comprising:

providing a first internal data structure for storing a plurality of objects;

storing objects in the first internal data structure;

using the first internal data structure;

monitoring usage of the first internal data structure;

associating costs with one or more operations on the first internal data structure;

determining a first cost of operation associated with the first internal data structure based on the costs associated with the one or more operations;

determining a second cost of operation associated with a second internal data structure which is distinct from the first internal data structure;

comparing the first cost of operation to the second cost of operation; and if the first cost of operation is greater than the second cost of operation, creating the second internal data structure; and migrating the objects stored in the first internal data structure to the second internal data structure.

15. The method of claim 14, wherein determining the second cost of operation associated with the second internal data structure comprises determining a cost associated with creating the second internal data structure and migrating the objects to the second internal data structure.

16. The method of claim 15, wherein determining the second cost of operation associated with the second internal data structure further comprises determining a cost associated with storing objects in the second internal data structure and retrieving objects from the second internal data structure.

17. The method of claim 14, further comprising periodically repeating the steps of determining the first cost of operation associated with the first internal data structure, determining the second cost of operation associated with the second internal data structure and comparing the first cost of operation to the second cost of operation.

18. The method of claim 14, wherein determining the cost of operation associated with at least one of the first internal data structure and the second internal data structure comprises computing a cost based on estimated usage.

19. The method of claim 14, wherein determining the cost of operation associated with at least one of the first internal data structure and the second internal data structure comprises computing a cost based on empirical usage data.

20. The method of claim 14, further comprising, if the first cost of operation is greater than the second cost of operation, deleting the first internal data structure after migrating the plurality of objects to the second internal data structure.

21. The method of claim 14, wherein providing the first internal data structure for storing a plurality of objects comprises providing a cache system having the first internal data structure in a network proxy.

22. The method of claim 21, wherein using the first internal data structure comprises storing and retrieving entries in the first internal data structure, wherein each entry includes an object comprising a Web page and a corresponding key comprising a uniform resource locators (URL) corresponding to the Web page.

23. The method of claim 21, wherein using the first internal data structure comprises storing and retrieving entries in the first internal data structure, wherein each entry includes an object comprising an IP address and a corresponding key comprising a server name corresponding to the IP address.

24. The method of claim 21, wherein using the first internal data structure comprises storing and retrieving entries in the first internal data structure, wherein each entry includes an object comprising selected configuration data and a key comprising a parameter name.

25. The method of claim 21, wherein using the first internal data structure comprises storing and retrieving entries in the first internal data structure, wherein each entry includes an object comprising a shared resource and a key comprising a resource identifier.

26. The method of claim 21, wherein using the first internal data structure comprises storing and retrieving entries in the first internal data structure, wherein each entry includes an object comprising an open network connection and at least one key comprising one or more of: a system and a port to which the connection has been made and a communication protocol used for the connection.

27. The method of claim 14, wherein the first and second internal data structures comprise at least two types selected from the group consisting of: lists; hashes, trees, heaps and hybrid data structures.

28. The method of claim 14, wherein the first internal data structure comprises a cache within a multi-tiered cache system, and wherein at least one tier of caches in the multi-tiered cache system is configured to store references to caches as data objects.

29. The method of claim 14, wherein providing each internal data structure comprises creating a corresponding cache using a C++ template.

30. A computer readable storage medium embodying a plurality of instructions readable by a data processor, wherein the instructions are configured to cause the data processor to perform the method comprising:

providing a first internal data structure for storing a plurality of objects;

storing objects in the first internal data structure;

using the first internal data structure;

monitoring usage of the first internal data structure;

associating costs with one or more operations on the first internal data structure;

determining a first cost of operation associated with the first internal data structure based on the costs associated with the one or more operations;

determining a second cost of operation associated with a second internal data structure which is distinct from the first internal data structure;

comparing the first cost of operation to the second cost of operation; and if the first cost of operation is greater than the second cost of operation, creating the second internal data structure and migrating the objects stored in the first internal data structure to the second internal data structure.

31. The software product of claim 30, wherein determining the second cost of operation associated with the second internal data structure comprises determining a cost associated with creating the second internal data structure and migrating the objects to the second internal data structure.

32. The software product of claim 31, wherein determining the second cost of operation associated with the second internal data structure further comprises determining a cost associated with storing objects in the second internal data structure and retrieving objects from the second internal data structure.

33. The software product of claim 30, wherein the method further comprises periodically repeating the steps of determining the first cost of operation associated with the first internal data structure, determining the second cost of operation associated with the second internal data structure and comparing the first cost of operation to the second cost of operation.

34. The software product of claim 30, wherein determining the cost of operation associated with at least one of the first internal data structure and the second internal data structure comprises computing a cost based on estimated usage.

35. The software product of claim 30, wherein determining the cost of operation associated with at least one of the first internal data structure and the second internal data structure comprises computing a cost based on empirical usage data.

36. The software product of claim 30, wherein the method further comprises, if the first cost of operation is greater than the second cost of operation, deleting the first internal data structure after migrating the plurality of objects to the second internal data structure.

37. The software product of claim 30, wherein providing the first internal data structure for storing a plurality of objects comprises providing a cache system having the first internal data structure in a network proxy.

38. The software product of claim 37, wherein using the first internal data structure comprises storing and retrieving entries in the first internal data structure, wherein each entry includes an object comprising a Web page and a corresponding key comprising a uniform resource locators (URL) corresponding to the Web page.

39. The software product of claim 37, wherein using the first internal data structure comprises storing and retrieving entries in the first internal data structure, wherein each entry includes an object comprising an IP address and a corresponding key comprising a server name corresponding to the IP address.

40. The software product of claim 30, wherein the internal data structures are configured to store configuration parameters by storing selected configuration data as objects and parameter names as keys corresponding to the objects.

41. The software product of claim 30, wherein the internal data structures are configured to store shared resources as objects and resource identifiers as keys corresponding to the objects.

42. The software product of claim 30, wherein the internal data structures are configured to store open network connections as objects and systems, ports and communication protocols corresponding to the open network connections as keys corresponding to the objects.

43. The software product of claim 30, wherein the first and second internal data structures comprise at least two types selected from the group consisting of: lists; hashes, trees, heaps and hybrid data structures.

44. The software product of claim 30, wherein the first internal data structure comprises a cache within a multi-tiered cache system, and wherein at least one tier of caches in the multi-tiered cache system is configured to store references to caches as data objects.

45. The software product of claim 30, wherein providing each internal data structure comprises creating a corresponding cache using a C++ template.

* * * * *